United States Patent
Lundberg

(10) Patent No.: US 7,233,859 B2
(45) Date of Patent: Jun. 19, 2007

(54) METHOD AND DEVICE FOR PLANNING A TRAJECTORY

(75) Inventor: Kristian Lundberg, Linköping (SE)

(73) Assignee: SAAB AB, Linkoping (SE)

( * ) Notice: Subject to any disclaimer, the term of this patent is extended or adjusted under 35 U.S.C. 154(b) by 287 days.

(21) Appl. No.: 10/960,945

(22) Filed: Oct. 12, 2004

(65) Prior Publication Data

US 2006/0031004 A1    Feb. 9, 2006

(30) Foreign Application Priority Data

Oct. 13, 2003    (EP) .................................. 03078219

(51) Int. Cl.
*G01C 21/36* (2006.01)

(52) U.S. Cl. .................... 701/200; 701/1; 701/208; 244/3.1

(58) Field of Classification Search ........ 701/200–202, 701/1, 10, 208; 244/3.1, 3.15
See application file for complete search history.

(56) References Cited

U.S. PATENT DOCUMENTS

| 4,812,990 | A |   | 3/1989  | Adams et al. |
|-----------|---|---|---------|--------------|
| 5,504,686 | A |   | 4/1996  | Lippitt et al. |
| 5,706,011 | A |   | 1/1998  | Huss et al. |
| 5,728,965 | A | * | 3/1998  | Fesland et al. ............ 89/1.11 |
| 6,317,690 | B1|   | 11/2001 | Gia |
| 6,920,827 | B2| * | 7/2005  | Llyod ....................... 102/497 |

* cited by examiner

*Primary Examiner*—Y. Beaulieu
(74) *Attorney, Agent, or Firm*—Bingham McCutchen LLP

(57) ABSTRACT

The present invention relates to planning of a trajectory for minimum threat exposure in a given geographical region. A trajectory is planned from a start node to a final node in a digital representation of the geographical region. The threat exposure for a vehicle moving along the trajectory is determined. Navigation performance of the vehicle along the trajectory is evaluated. A rate of survival based on threat exposure and navigation performance along the trajectory is estimated. A new trajectory is planned from the start node to the final node until a best rate of survival is established for the planned trajectory.

21 Claims, 3 Drawing Sheets

MAP

VEHICLE

METHOD AND DEVICE FOR PLANNING A TRAJECTORY

TECHNICAL FIELD

The present invention relates to a method of planning a trajectory for minimum threat exposure in a given geographical region.

BACKGROUND OF THE INVENTION

Tactical mission planning for airborne vehicles, e.g. UAV:s or robots, where the missions are carried out on ground targets is a very complex task. Any deviation from navigating along a straight line between two locations may cause a tactical deviation as well as a deviation in navigation performance. When routing a trajectory for a covert operation, it is desirable to route the paths such that maximum terrain masking is achieved. Particularly, it is desirable to avoid highly visible areas such as ridge tops and wide open areas. However, an advantageous route planning from a terrain point of view may cause a tactical disadvantage due to e.g. threat exposure or a disadvantage due to the performance of the navigation systems.

Digital terrain elevation data (DTED) is a digital representation of the topography of a geographical region. DTED may be produced from satellite photographs or other means and may include digital data representing altitudes and type of terrain. The data is preferably represented in a grid with equal spacing between the nodes.

According to the prior art, it is known to route covert flight paths using DTED such that the flight path is always in the lowest local area. This routing method rests on the assumption that the best terrain masking will always be at the lowest local elevation. However, this assumption is not always true, and thus the prior art method frequently results in less than optimum routing of flight paths. A significant disadvantage with this prior art method is also that it does not interrelate the tactical performance with the performance of the navigation system.

Terrain navigation, where the actual position of a vehicle is predicted from terrain information available in the present and preceding environment, is increasingly becoming an integrated function in vehicle navigation systems. This increases the possibility of planning a trajectory in a disturbed environment where GPS is not available and to replan trajectories during a mission. However, replanning of a trajectory during a mission does not only involve replanning from a navigational point, but also from a tactical point of view. Known methods of planning trajectories do not satisfactorily address this issue.

One method of routing a covert flight path is disclosed in U.S. Pat. No. 5,504,686. The disclosed method involves routing a covert flight path from digital terrain elevation data of a geographical region. A cost surface is formed from a weighted combination of hideability and flyability in the given area. The flight path is routed in the areas of the costing surface that are both hideable and flyable. However, this method does not take the performance of the navigational system into the route calculation.

Hence, the prior art includes various solutions for planning trajectories based on terrain data. However, they do not involve the complete functionality of the navigational system in the optimization problem. Maps for terrain navigation may be included, but only to display a static image of where the flyability in the terrain is considered to be low and not to dynamically integrate navigational performance and tactical performance in the optimization of the trajectory. Therefore, the trajectories achieved through the prior art planning systems are far from optimized.

SUMMARY OF THE INVENTION

The object of the present invention is therefore to provide a solution that alleviates the above-described disadvantages of the prior art and provides a trajectory with minimal threat exposure from a navigational as well as a tactical point of view.

According to one aspect of the invention, these objects are achieved by the method of planning a trajectory for minimum threat exposure in a given geographical region, wherein the trajectory is planned from a first node to a second node in a digital representation of the geographical region. The threat exposure for a vehicle moving on a trajectory from the first to the second node is determined. The navigation performance of the vehicle moving on the trajectory is evaluated. A rate of survival based on threat exposure and navigation performance for the vehicle moving on the trajectory is estimated. A new trajectory is planned from the first node to the second node until a trajectory with a best rate of survival is established.

Thereby, the invention offers the advantage over previous solutions by taking the actual performance of the vehicles navigation systems into consideration when evaluating the rate of survival.

In accordance with a specific embodiment of the invention, the method of planning a trajectory is performed on a node by node basis. The first node that has a given rate of survival is established as a start node. A set of adjacent nodes in the digital representation is selected. The threat exposure and navigation performance of a vehicle moving from the start node to each node in the set of adjacent nodes is estimated. Based on the given rate of survival in the start node and the contribution from the threat exposure and navigation performance when moving from the start node to the adjacent node, a rate of survival is estimated for each node in the set of adjacent nodes. The same evaluation of rate of survival is then performed for a new set of start nodes, where the set of start nodes corresponds to the previous set of adjacent nodes. This evaluation is repeated until the rate of survival for all nodes on a multitude of trajectories from a first to a second node has been established. When a best rate of survival has been established for a trajectory from the first to the second node, this trajectory is chosen as the preferred trajectory.

According to a preferred embodiment of the invention, the method of planning a trajectory includes forming a terrain optimization map indicative of threat exposure in the given geographical region, and forming a navigation map indicative of navigation performance of the vehicle whilst moving in the region. Each map is based on a digital representation of the geographical region with a grid structure with set values assigned to each node in the grid structure. The set values of each node in the terrain optimization map and in the navigation map are used to estimate a best rate of survival.

According to yet another preferred embodiment of the invention the method of planning the trajectory includes planning a path by minimizing the threat exposure from a first node to a second node in the terrain optimization map. The navigation performance is evaluated along the path from the first node to the second node in the navigation map. The threat exposure in the terrain optimization map is adjusted with regard to impact of navigation performance along the path. A rate of survival is estimated for the path, whereupon a new path is selected. The steps are repeated until a path with a best rate of survival is selected. The trajectory is planned as a multitude of interconnected paths from the first node to the second node, where the trajectory is selected as the set of interconnected paths that provide the best rate of survival.

The invention also includes a computer program directly loadable into the internal memory of a computer comprising software for controlling the inventive method of planning a trajectory when said program is run on the computer.

The invention further includes a computer readable medium, having a program recorded thereon, where the program is to make a computer control the inventive method of planning a trajectory.

BRIEF DESCRIPTION OF THE DRAWINGS

The present invention is now to be explained more closely by means of preferred embodiments, which are disclosed as examples, and with reference to the attached drawing.

DESCRIPTION OF THE PREFERRED EMBODIMENT

A preferred embodiment will now be described with reference to the accompanying drawings. The invention will in the preferred embodiment be described in relation to planning a trajectory for an airborne vehicle. However, the invention is not limited to planning trajectories for airborne vehicles. It is obvious for a person skilled in the art that the method in accordance with the invention may also be used for planning a trajectory or a route for an underwater vehicle.

Figure 1:
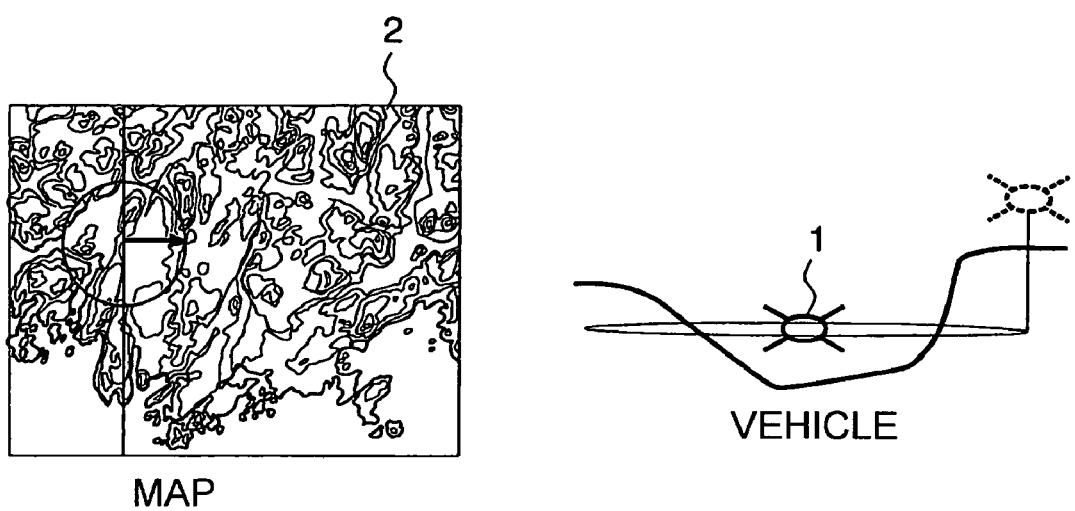
FIG. 1 illustrates the impact of a navigation error on the exposure of a vehicle

FIG. 1 discloses the impact of a navigation error in relation to threat exposure. A vehicle 1 has a planned trajectory in a given geographical region illustrated on a map 2. The navigation error for the vehicle may be illustrated by a circular error region centered around each point along a trajectory as illustrated in FIG. 1. Any position within the error region could be a possible "true" position affecting the terrain following flight capabilities, especially if the terrain following trajectory is determined from the digital terrain elevation database. A conservative terrain following adaptation is necessary since each elevation data in the region must be examined. The highest altitude within the error region must in each position i along the planned trajectory be the chosen altitude. The effect of this may be seen in FIG. 1, where the navigation error includes the steep region which must be set as the altitude at position i. It is obvious that this also affects the threat exposure of a vehicle in this position.

The planning of a trajectory for minimum threat exposure is based on a digital terrain elevation map that describes the topography in a geographical region. Terrain is herein taken to mean terrain on land or under water. The invention aims at solving a path finding problem for both airborne vehicles and underwater vehicles that navigate by means of underwater terrain. The terrain elevation map is based on information from an elevation database that provides a discrete representation of the terrain. The map is preferable in the form of a grid structure with altitude measurements assigned to each node in the structure. The grid is in a preferred embodiment uniformly divided into squares of 50 meters.

Figure 2:
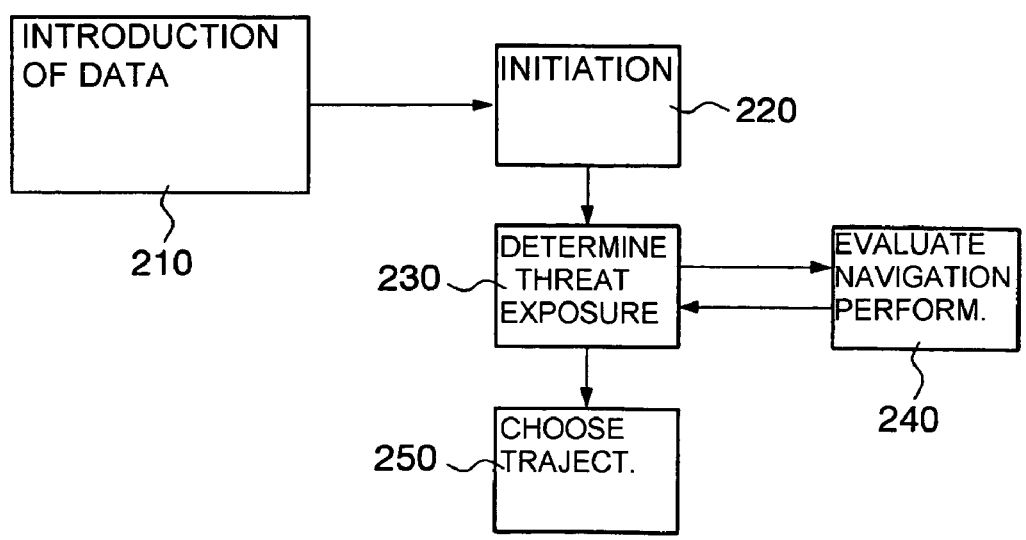
FIG. 2 shows by means of a flow diagram, a method of planning a trajectory according to the invention

FIG. 2 shows by means of a flow diagram, a method for planning a trajectory according to the invention. A first step 210 involves introduction of data. The data may include maps in the form of a terrain optimization map, a navigation map and a deviation map. The data also includes information regarding threat exposure and system parameters influencing the behavior of the navigation systems. The data presented in maps may of course also be provided in a database without connections to a map. In an initiation step 220, a first trajectory is selected from a first node to a second node. In a subsequent step 230 the threat exposure of a vehicle moving along the planned trajectory is determined. The navigation performance of the vehicle is evaluated in step 240. The step further includes calculation of a rate of survival for the vehicle based on threat exposure and navigation performance along the planned trajectory. A new trajectory is selected from the first to the second node. The steps 230–240 are repeated until a best rate of survival is established for a planned trajectory. This trajectory is then chosen in step 250 as the trajectory for minimum threat exposure.

Figure 3:
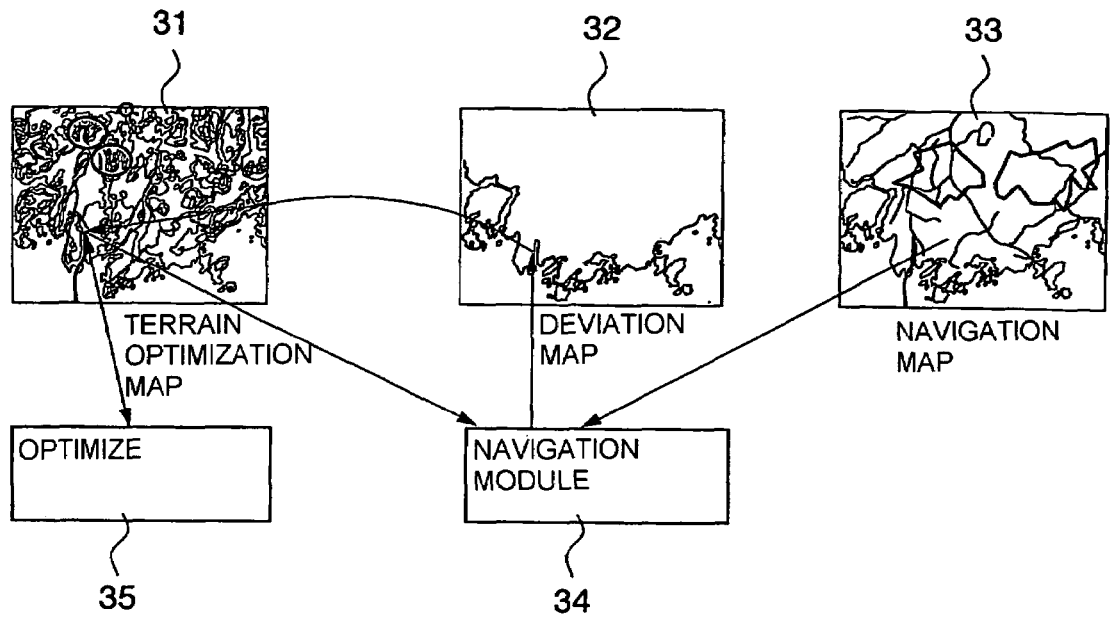
FIG. 3 illustrates schematically a preferred embodiment of the invention FIG. 4 discloses schematically determination of the terrain measurement for a navigation system FIG. 5 discloses possible node transitions from a node i to local node layers

In a preferred embodiment of the invention, the method of planning a trajectory is based on generating a number of maps related to terrain information, tactical information and navigational information. FIG. 3 discloses terrain based information, e.g. maps, that may be introduced in the process of planning and re-planning a trajectory. In a preferred embodiment of the invention, the information is represented in three maps: terrain optimization map 31, navigation map 33 and deviation map 32. A preferred trajectory is planned through a dynamic optimization in the terrain optimization map 31, the deviation map 32 and the navigation map 33; each of which is individually generated.

Terrain Optimization Map

The terrain optimization map 31 is indicative of which areas on a given digital terrain elevation plot that are most exposed. The terrain optimization map 31 includes digital terrain elevation data. The map is based on a grid structure where each node represents a set value. The value of each node represents the elevation of the corresponding geographical location in combination with the exposure probability and threat scenario in the same location. Other types of information may also be included in this map to visualize a threat scenario related to parameters in the environment of the vehicle for which the flight path is generated. The threat scenario may include different types of threats relating to anti-aircraft defense or areas that may not be entered due to other types of reasons, e.g. non-military areas. The threat scenario and the increased risk of flying over these areas are included into the terrain optimization map by increasing the value in the respective node of the grid.

The terrain optimization map 31 may also include information from a visibility map relating to the visibility of a vehicle within the surrounding terrain. The visibility map is based on the actual geographical area, preferably represented in a grid map having the same resolution as the terrain optimization map. Other resolutions may of course also be possible.

The terrain optimization map 31 may include information from a visibility mapping indicative of visible and hideable areas within the geographical region. This information may also be presented in a visibility map that is handled separately in combination with the terrain optimization map. The visibility map may be formed from the digital terrain elevation data. To generate this map a calculation is made for each point j in the digital terrain elevation map. For a given point j within the grid, a circle of radius R is analyzed. The scalar value assigned to each point j describes the sum of the terrain elevation in the circle of analysis starting from the point j. If the surrounding terrain is more elevated than the point of analysis j, the total value is large and the point of analysis is not very exposed. Thus, scalar value is low. Contrary, if the scalar value is high the point of analysis j is very exposed and thus not recommendable in a planned flight path. More threats may be analyzed in this manner and each threat has its associated visibility representation. The result of the visibility mapping is, in a preferred embodiment of the invention, included in the terrain optimization map.

Navigation Map

The navigation map 33 may be presented as a grid map with a terrain measurement in each grid point that describes the reliability of the navigation system, when the vehicle is positioned within the respective terrain area. The navigation map thus provides information regarding how the navigation systems and sensors in the vehicle respond to the actual terrain. The navigation map 33 provides information on whether GPS or other type of radio navigation equipment is unavailable within a given area. In the preferred embodiment, the resolution of the navigation map corresponds to that of the terrain optimization map, but other resolutions are also possible.

If a terrain navigation system is used that compares data from the actual terrain with data from the digital elevation database to generate an estimated position, the navigation map includes information regarding the correctness of the estimated position. If the terrain is leveled without distinguishing features, the measured terrain trace will be difficult to match with unique terrain elevation data. If the terrain is more varied, the possibility for the terrain navigation system to deliver a reliable estimated position increases. The reliability in the estimated positions is very dependent upon variations in the terrain, the frequency and intensity of terrain variations.

Figure 4:
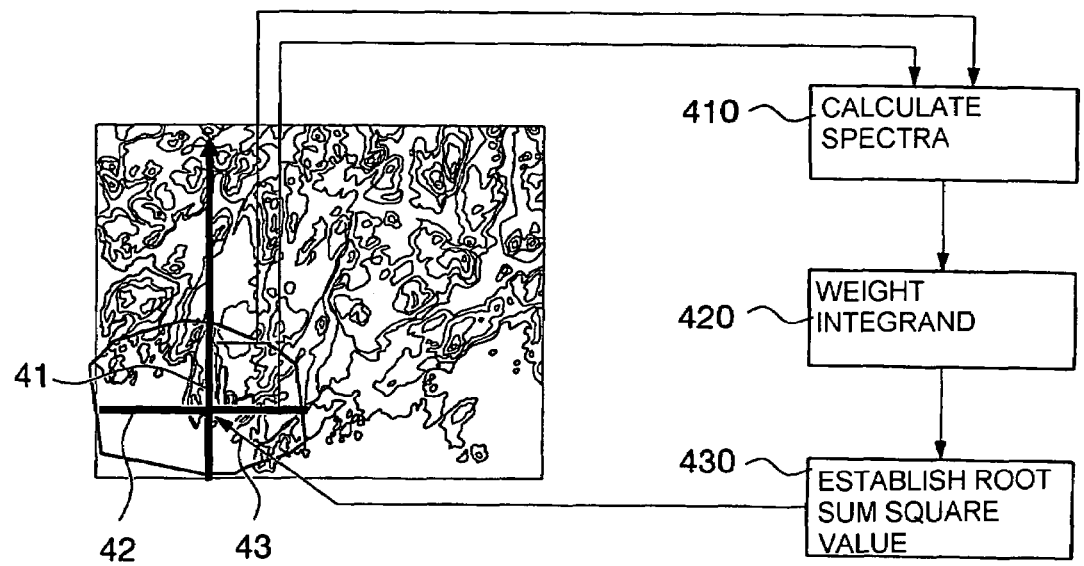

FIG. 4 discloses one method of determining the terrain measurement in accordance with the invention. The terrain measurement can be considered as a static description of the terrain that corresponds to "reality". The mapping provides a first and a second perpendicular trace 41, 42 that define a surface 43. The numerical value from the determination is within the middle coordinate in FIG. 4, the intersection between the traces. Since the terrain measurement is calculated from a surface, this measurement is a good estimate for all directions that passes through the actual node. Other means to decide the terrain measurement may be to estimate terrain information in a number of directions and allowing each direction to be represented by a scalar value for the actual direction. A final scalar value is obtained through mean value calculation of the scalar values.

In step 410 a spectra is calculated as a function of frequency for each terrain trace in x and y directions according to:

$$p_{x,y}(f) = \int_0^\infty |h_{x,y}(t)|^2 \, dt \quad [1]$$

The two spectra $p_x(f)$, $p_y(f)$ are integrated over a frequency range that is considered relevant for the performance of the navigation system, e.g. a terrain navigation system. In step 420 the integrand is weighted with the frequency in order to increase the importance of the higher frequencies. The result can be seen as a weighted variance measurement in two dimensions. The integration and weighting frequency $f_w$ Hz has been established related to the performance of a terrain navigation system, e.g. TERNAV:

$$P_{x,yTERNAV} = \int_0^{f_w} \left(1 - \frac{f}{f_w}\right) \cdot p_{x,y}(f) \, df \quad [2]$$

In order to generated a scalar terrain measurement, the root sum square value is established in a final step 430:

$$P_{TERNAV}(x, y) = \sqrt{P_{xTERNAV}^2 + P_{yTERNAV}^2} \quad [3]$$

The navigation map 33 supports path finding from a navigation point of view. The navigation map 33 may also be used as a secondary condition during optimization to estimate how large navigation error that may occur under optimization of the terrain profile.

Deviation Map

The deviation map 32 is a map with information regarding the navigation error. The deviation map 32 discloses the increased exposure in node j due to the navigation error. The exposure in each node in the grid is minimized by flying as close to the ground as possible. Therefore, it is important to estimate the lowest height during flight. The minimum level for flyability is set through topography and the risk for hitting e.g. trees. In this sense the navigation error is very important for setting the lowest allowed level. If the navigation error in a certain point has radius x, the database must be searched in this circle to prevent ground collision. The largest height within the circle is thus the present lowest terrain elevation for the terrain following. This procedure is repeated for all points and for different navigation errors e.g. 50, 100, 200, 400 and 800 m. Interpolation is performed between these representations of navigation errors; the multidimensional deviation map discloses increased terrain elevation and increased exposure that can be handled in the optimization.

Optimization Loop

In the method according to the invention, a trajectory is optimized from a start point or starting area to a final point or final area. Both these situations are covered by the present description that discloses the planning of a trajectory from a start node to a final node, where the node may represent a geographical location or area.

The inventive method is initiated by extracting a suitable extract from a map and introducing the corresponding part of the terrain optimization map 31 in a matrix of cost.

In an optimization step 35, optimization algorithms of the invention calculate the optimal road between two points or areas based on tactical and navigational performance. The inventive algorithm determines the least expensive relocation from starting node s to ending node t under a number of primary and secondary conditions. The primary conditions include:

Minimizing accumulated elevation profile and visibility
Minimize threat exposures The secondary conditions include:

Setting a starting point or starting area and ending point or ending area
Maintaining the navigation error below a specified level
Providing a given set of break points
Not surpassing the load factor
The algorithm minimizes the total cost $c(d_{ij}, t, n_{lat}, Av(n_{lat}), a_{lat})$ where
threat exposure $d_{ij}$ is the main criteria to be minimized in the optimization
specific time t may be used to define time windows on certain parts of the map
lateral navigation error $n_{lat}$ defines the relationship between navigation error and threat exposure
deviation cost $Av(n_{lat})$ is generated from the navigation error $n_{lat}$ in the deviation maps
lateral acceleration $a_{lat}$ defines acceleration limitations that may not be surpassed
The recursion formula is:

$$c(j,t,n_{lat},a_{lat}) = \min_i[d_{ij} + c(i,t_i,n_{lat}^i,a_{lat}^i) | t = t_i + t_{ij}, n_{lat}^j = n_{lat}^i + n_{ij}, a_{lat} = a_{lat}^i + a_{lat\_ij}] \quad [4]$$

where $d_{ij}$ represents the cost matrix representing the cost of moving from node i to node j in the terrain optimization map.

In order to correspond to the reality described by a dynamic object moving over the terrain, a local cluster of arcs must be set up. The cluster is arranged in accordance with FIG. 5.

Figure 5:
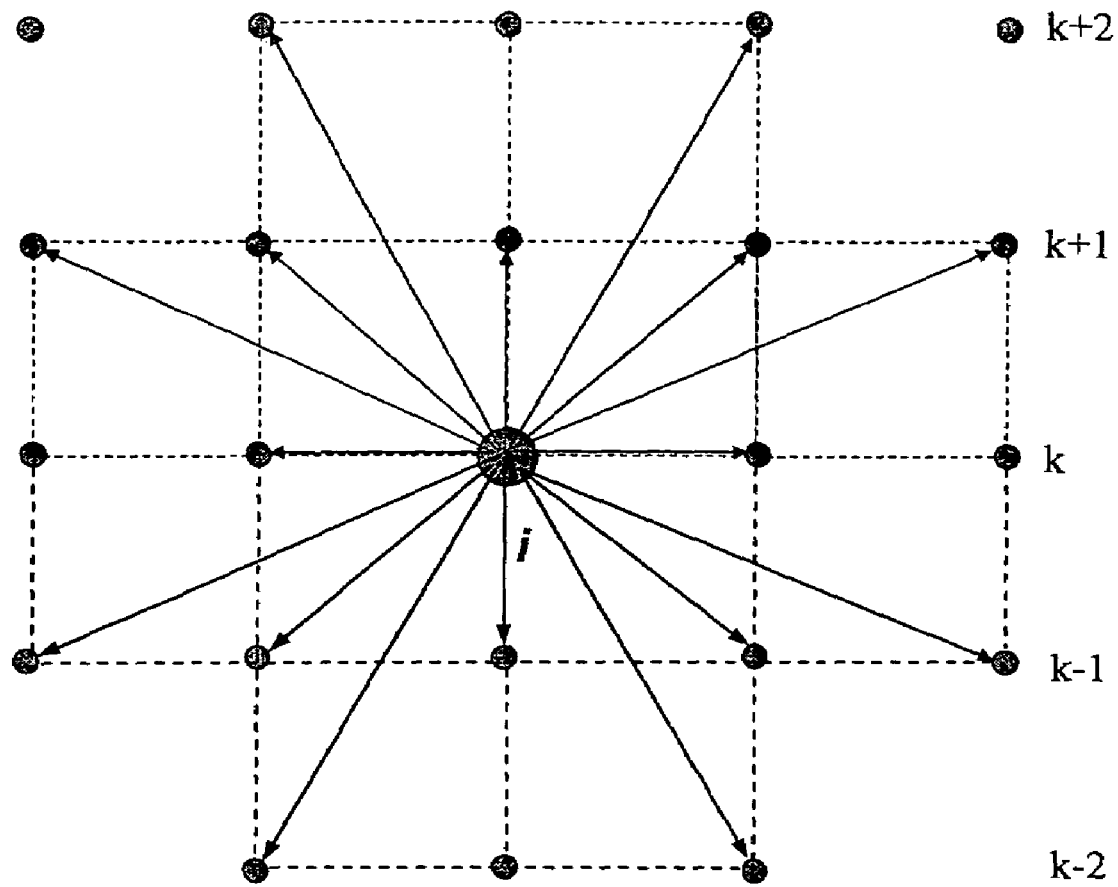

For $d_{ij}$, the grid is divided into sub-matrices that represent arcs to the respective node layer. In FIG. 5 16 arcs are represented.

The $d_{ij}$ matrix is then for the arcs represented in FIG. 5

$$d_{ij} = \begin{bmatrix} d_{ij}^3 & d_{ij}^4 & d_{ij}^5 & & & & & & \\ d_{ij}^2 & d_{ij}^3 & d_{ij}^4 & d_{ij}^5 & & & & & \\ d_{ij}^1 & d_{ij}^2 & d_{ij}^3 & d_{ij}^4 & d_{ij}^5 & & & & \\ & d_{ij}^1 & d_{ij}^2 & d_{ij}^3 & d_{ij}^4 & d_{ij}^5 & & & \\ & & & & \ddots & & & & \\ & & & d_{ij}^1 & d_{ij}^2 & d_{ij}^3 & d_{ij}^4 & d_{ij}^5 & \\ & & & & d_{ij}^1 & d_{ij}^2 & d_{ij}^3 & d_{ij}^4 & d_{ij}^5 \\ & & & & & d_{ij}^1 & d_{ij}^2 & d_{ij}^3 & d_{ij}^4 \\ & & & & & & d_{ij}^1 & d_{ij}^2 & d_{ij}^3 \end{bmatrix}$$

where $d_{ij}^{1 \rightarrow 5}$ correspond to the arc
matrix from node i to the node layer k, k+1, k+2, k−1, k−2. This matrix is compressed by reducing all non active arcs and allowing the result to be saved in the compressed cost matrix $d_{ij}^{comp}$.

The required arc information is reduced to $O(n^2)$ (proportional to the nodes in the network), which also affects the execution time for the algorithm. In order to reduce the computational effort, a further limitation of accessible arcs is introduced which is controlled by the dynamic performance of the actual vehicle. The result enables planning in 3-D that only generates 3–5 times as many arcs as the lateral case with fully acceptable execution times.

The recursion formula repeats node transfers from all nodes i to a given node j in accordance with principles for dynamic programming. When all nodes have been run through, the total cost of the optimal solution is obtained through examining the lowest cost for reaching the final node t.

The algorithm determines the least exposed route in the terrain optimization map for repositioning without errors. There is also a dynamic model of an integrated navigation system that describes the accumulated errors of the different navigation sensors individually as well as the resulting or accumulated error increment of the entire integrated navigation system. In a preferred embodiment of the invention, the fault increment for a system consisting of an inertial navigation system (INS), GPS and a terrain navigation system (TRN) is modeled and fused to an integrated solution. The accumulated fault increment $n_{lat}^j$ describes the deviation of the vehicle from the ideal position for node j when a path through the network is evaluated in the optimization algorithm. The navigation system may also include additional sensors such a sensors for radio navigation and target tracking navigation. These sensors must then be integrated in the navigation module to describe the variation in navigation performance for each node transition i->j.

The integrated navigation error $n_{lat}^j$ depends on the path chosen in the terrain, on the information that the navigation system extracts from the navigation map and on the dynamic manoeuvres performed during the trajectory. The navigation map describes the navigation performance of e.g., a terrain navigation system TRN and provides information as to where in the terrain GPS is unavailable or suffers from bad coverage. With this information, the position error is calculated for the present location and path. The resulting navigation error depends on the accessibility of the sensors.

When GPS is available, the navigation error for the integrated navigation system is at least: error_GPS=Xm. Whether or not GPS is available may be determined through the availability measure $Q_{GPS}$ from the navigation map 33. $Q_{GPS}=1$ if GPS is available; otherwise $Q_{GPS}=0$. The size of the navigation error X is determined from the GPS performance.

For the inertial navigation system, the navigation error, error_INS=$f_{INS\_error}$. Here $f_{INS\_error}$ is a function of time, speed and equipment specific parameters such as: Accelerometer bias, noise, scale factor error, cross axis sensitivity and Gyro noise, drift, scale factor error, cross axis sensitivity. Error_INS will be applied as the integrated navigation error, only if no other sensor is available.

The navigation error for the terrain navigation system may be expressed as error_TRN, which is determined as: Navigation error_TRN=$f_{TRN\_Nav}$ ($Z_{TRN}$=Navigation map (latitude, longitude), t). The navigation error for the TRN is determined by means of the navigation map 33. For each point j in the grid, with a given longitude and latitude, there is a scalar value $Z_{TRN}$ that describes the response of the TRN system according to the terrain information. This value determines whether the TRN system can deliver an estimated position and also the actual error estimation. The function $f_{TRN\_Nav}$ also depends on the time t exposed for a specific map information value $Z_{TRN}$, and also if any time delay is relevant to the TRN behaviour. The integrated navigation system error equals error_TRN if GPS and other radio navigation sensors are unavailable.

In order to associate the navigational performance and the tactical performance, the following steps are carried out in the navigation module 34 for each transition from node i to node j:

the cost $c_{ideal}(j,t,n_{lat},a_{lat})$ for a transition without navigation errors is determined in accordance with $c_{ideal}(j,t,n_{lat},a_{lat})=d_{ij}+c(i,t_i,n_{lat}^i,a_{lat}^i)$ the navigation state $n_{lat}^j$ (the navigation error in location j with the active set of sensors in location j) is updated by using the new position for node j and the old navigation state $n_{lat}^i$ calculating the navigation sensor errors via vehicle transition and navigation map information in point j. An overall sensor fusion of the integrate navigation system determines the navigation error at location j $n_{lat}^j$.

the navigation error and geographical position are used as input to the deviation map in order to present the increased degree of exposure as a cost $c_{exp}$(position, $n_{lat}^j$). In this case, it is presented in the dimension meter.

updated and correct cost of node j is then:

$$c(j,t,n_{lat},a_{lat})=c_{ideal}(j,t,n_{lat},a_{lat})+c_{exp}(\text{position},n_{lat}^j)$$

The increased degree of exposure is added to the terrain optimization map 31 in order to determine if the analyzed path to the local point j is optimal. The optimization of the path in the network continues with this closed loop for all nodes.

FIG. 3 discloses schematically the preferred embodiment of the invention. The maps are generated initially. The deviation map 32 and the navigation map 33 may be generated beforehand for a very large area. Additional information such as threat and dysfunctional navigation systems are added to the navigation map 33 and the terrain optimization map when this information is available.

During an initiation stage in the inventive method, suitable terrain sections of the maps are unpacked and the terrain optimization map 31 is introduced in the cost matrix $d_{ij}^{komp}$. The initiation phase also includes introduction of parameters specific to performance of the vehicle dynamics and certain equipment in the navigation system such as gyro, accelerometer, GPS and TRN.

The recursive method is based on finding the least expensive arcs to the nodes that are interconnected in the grid. The cost for each transition between nodes is in part fixed from the terrain optimization map, but an additional cost may be added after the navigation loop has been run through. The navigation loop processes data including: position, speed, the two earlier visited nodes i-1, i-2, state of navigation in the node i in the form of active sensors and navigation errors. The increased exposure from the estimated navigation error at node j is added to the earlier arc cost from $d_{ij}^{komp}$ for transition from node i to node j. It is now possible to determine if the cost at node j is optimal or not, i.e. finding a path to node j.

This recursion proceeds until all nodes have been run through and the final node is reached. The resulting path or route may then be extracted.

The planning algorithm is modular and possible to adapt for planning of paths for multiple vehicles.

The invention claimed is:

1. A method of planning a trajectory for minimum threat exposure in a given geographical region wherein the trajectory is planned from a first node to a second node in a digital representation of the geographical region, comprising:
   i) selecting a trajectory from the first node to the second node;
   ii) determining threat exposure for a vehicle moving on a trajectory from the first node to the second node;
   iii) evaluating navigation performance for the vehicle moving along the trajectory;
   iv) estimating a rate of survival based on threat exposure and navigation performance along the trajectory;
   v) repeating steps i)–iv) until a trajectory with a best rate of survival is selected.

2. A method of planning a trajectory according to claim 1, further comprising:
   i) setting the first node as a start node with a given rate of survival;
   ii) selecting an adjacent node in the digital representation;
   iii) determining threat exposure for a vehicle moving from the present start node to the adjacent node in the digital representation;
   iv) evaluating navigation performance of the vehicle moving from the start node to the adjacent node;
   v) estimating a rate of survival for the adjacent node based on the given rate of survival in the start node, the threat exposure and the navigation performance;
   vi) repeating steps ii)–v) until a rate of survival has been established for a predetermined set of adjacent nodes;
   vii) selecting a start node from the set of adjacent nodes and repeating steps ii) vi), until each node in the predetermined set of adjacent nodes has been evaluated as a start node;
   viii) repeating steps ii)–vii) until a best rate of survival is established for the trajectory from the first node to the second node.

3. A method according to claim 1, further comprising: forming a terrain optimization map describing the threat exposure in the region and a navigation map describing the navigation performance of the vehicle moving in the region, wherein each map is based on the digital representation of the geographical region with a respective grid structure with set values assigned to each node in the grid structure and wherein estimation of the rate of survival is based on the set values in the terrain optimization map and in the navigation map.

4. A method according to claim 3, wherein the set values assigned to the nodes in the terrain optimization map represent the threat exposure of the vehicle in the node.

5. A method according to claim 3, wherein the set values assigned to the nodes in the navigation map represent a terrain measurement indicative of the navigation performance.

6. A method according to claim 3, wherein a deviation map is formed that is indicative of increased threat exposure with increased navigation error, which deviation map is a multidimensional grid structure based on the digital representation of the geographical region.

7. A method according to claim 1, wherein the method further includes the steps of
   i) planning a path by minimizing the threat exposure from a first node to a second node in the terrain optimization map;
   ii) evaluating navigation performance in a corresponding path from a first node to a second node in the navigation map;
   iii) adjusting the threat exposure in the terrain optimization map with regard to impact of navigation performance when moving from the first to the second node;
   iv) estimating a rate of survival for the path;
   v) repeating step (i) until a path with best rate of survival has been established;

vi) and planning a trajectory as a multitude of interconnected paths, where the rate of survival is established for each set of interconnected paths forming a trajectory from the first node to the second node and where the trajectory is chosen as the set of interconnected paths that provides the best rate of survival.

8. A system comprising a computer program loaded in computer-readable internal memory medium of a computer, the computer program comprising software for controlling a method of planning a trajectory for minimum threat exposure in a given geographical region wherein the trajectory is planned from a first node to a second node in a digital representation of the geographical region when the program is run on the computer, the computer program controlling the computer to perform the steps of:
 i) selecting a trajectory from the first node to the second node;
 ii) determining threat exposure for a vehicle moving on a trajectory from the first node to the second node;
 iii) evaluating navigation performance for the vehicle moving along the trajectory;
 iv) estimating a rate of survival based on threat exposure and navigation performance along the trajectory;
 v) repeating steps i)–iv) until a trajectory with a best rate of survival is selected.

9. The system according to claim 8, the computer program further controlling the computer to perform the steps of:
 i) setting the first node as a start node with a given rate of survival;
 ii) selecting an adjacent node in the digital representation;
 iii) determining threat exposure for a vehicle moving from the present start node to the adjacent node in the digital representation;
 iv) evaluating navigation performance of the vehicle moving from the start node to the adjacent node;
 v) estimating a rate of survival for the adjacent node based on the given rate of survival in the start node, the threat exposure and the navigation performance;
 vi) repeating steps ii)–v) until a rate of survival has been established for a predetermined set of adjacent nodes;
 vii) selecting a start node from the set of adjacent nodes and repeating steps ii)–vi), until each node in the predetermined set of adjacent nodes has been evaluated as a start node;
 viii) repeating steps ii)–vii) until a best rate of survival is established for the trajectory from the first node to the second node.

10. The system according to claim 8, the computer program further controlling the computer to perform the steps of:
 forming a terrain optimization map describing the threat exposure in the region and a navigation map describing the navigation performance of the vehicle moving in the region, wherein each map is based on the digital representation of the geographical region with a respective grid structure with set values assigned to each node in the grid structure and wherein estimation of the rate of survival is based on the set values in the terrain optimization map and in the navigation map.

11. The system according to claim 8, wherein the set values assigned to the nodes in the terrain optimization map represent the threat exposure of the vehicle in the node.

12. The system according to claim 11, wherein the set values assigned to the nodes in the navigation map represent a terrain measurement indicative of the navigation performance.

13. The system according to claim 11, wherein a deviation map is formed that is indicative of increased threat exposure with increased navigation error, which deviation map is a multidimensional grid structure based on the digital representation of the geographical region.

14. The system according to claim 8, the computer program further controlling the computer to perform the steps of:
 i) planning a path by minimizing the threat exposure from a first node to a second node in the terrain optimization map;
 ii) evaluating navigation performance in a corresponding path from a first node to a second node in the navigation map;
 iii) adjusting the threat exposure in the terrain optimization map with regard to impact of navigation performance when moving from the first to the second node;
 iv) estimating a rate of survival for the path;
 v) repeating step (i) until a path with best rate of survival has been established and planning a trajectory as a multitude of interconnected paths, where the rate of survival is established for each set of interconnected paths forming a trajectory from the first node to the second node and where the trajectory is chosen as the set of interconnected paths that provides the best rate of survival.

15. A computer readable medium having a program recorded thereon, wherein the program is operable to make a computer control a method of planning a trajectory for minimum threat exposure in a given geographical region wherein the trajectory is planned from a first node to a second node in a digital representation of the geographical region when the program is run on the computer, the computer program controlling the computer to perform the steps of:
 vi) selecting a trajectory from the first node to the second node;
 vii) determining threat exposure for a vehicle moving on a trajectory from the first node to the second node;
 viii) evaluating navigation performance for the vehicle moving along the trajectory;
 ix) estimating a rate of survival based on threat exposure and navigation performance along the trajectory;
 x) repeating steps i)–iv) until a trajectory with a best rate of survival is selected.

16. A computer readable medium controlling a method of planning a trajectory according to claim 15, the computer program recorded on the computer readable medium further controlling the computer to perform the steps of:
 ix) setting the first node as a start node with a given rate of survival;
 x) selecting an adjacent node in the digital representation;
 xi) determining threat exposure for a vehicle moving from the present start node to the adjacent node in the digital representation;
 xii) evaluating navigation performance of the vehicle moving from the start node to the adjacent node;
 xiii) estimating a rate of survival for the adjacent node based on the given rate of survival in the start node, the threat exposure and the navigation performance;
 xiv) repeating steps ii)–v) until a rate of survival has been established for a predetermined set of adjacent nodes;
 xv) selecting a start node from the set of adjacent nodes and repeating steps ii)–vi), until each node in the predetermined set of adjacent nodes has been evaluated as a start node;

xvi) repeating steps ii)–vii) until a best rate of survival is established for the trajectory from the first node to the second node.

17. A computer readable medium controlling a method of planning a trajectory according to claim 15, the computer program recorded on the computer readable medium further controlling the computer to perform the steps of:

forming a terrain optimization map describing the threat exposure in the region and a navigation map describing the navigation performance of the vehicle moving in the region, wherein each map is based on the digital representation of the geographical region with a respective grid structure with set values assigned to each node in the grid structure and wherein estimation of the rate of survival is based on the set values in the terrain optimization map and in the navigation map.

18. A computer readable medium controlling a method of planning a trajectory according to claim 17, wherein the set values assigned to the nodes in the terrain optimization map represent the threat exposure of the vehicle in the node.

19. A computer readable medium controlling a method of planning a trajectory according to claim 17, wherein the set values assigned to the nodes in the navigation map represent a terrain measurement indicative of the navigation performance.

20. A computer readable medium controlling a method of planning a trajectory according to claim 15, wherein a deviation map is formed that is indicative of increased threat exposure with increased navigation error, which deviation map is a multidimensional grid structure based on the digital representation of the geographical region.

21. A computer readable medium controlling a method of planning a trajectory according to claim 15, the computer program recorded on the computer readable medium further controlling the computer to perform the steps of:

i) planning a path by minimizing the threat exposure from a first node to a second node in the terrain optimization map;

ii) evaluating navigation performance in a corresponding path from a first node to a second node in the navigation map;

iii) adjusting the threat exposure in the terrain optimization map with regard to impact of navigation performance when moving from the first to the second node;

iv) estimating a rate of survival for the path;

v) repeating step (i) until a path with best rate of survival has been established and planning a trajectory as a multitude of interconnected paths, where the rate of survival is established for each set of interconnected paths forming a trajectory from the first node to the second node and where the trajectory is chosen as the set of interconnected paths that provides the best rate of survival.

* * * * *